US 8,073,060 B2

(12) United States Patent
Compton et al.

(10) Patent No.: US 8,073,060 B2
(45) Date of Patent: Dec. 6, 2011

(54) VIDEO SYNCHRONIZATION

(75) Inventors: Matthew Compton, Winchester (GB); Clive Henry Gillard, Alton (GB)

(73) Assignee: Sony United Kingdom Limited, Weybridge (GB)

( * ) Notice: Subject to any disclaimer, the term of this patent is extended or adjusted under 35 U.S.C. 154(b) by 1304 days.

(21) Appl. No.: 10/813,286

(22) Filed: Mar. 30, 2004

(65) Prior Publication Data

US 2004/0257469 A1 Dec. 23, 2004

(30) Foreign Application Priority Data

Mar. 31, 2003 (GB) .................................. 0307459.8

(51) Int. Cl.
*H04N 7/12* (2006.01)
(52) U.S. Cl. .................. 375/240.28; 348/500; 348/521; 348/525
(58) Field of Classification Search ........................ None
See application file for complete search history.

(56) References Cited

U.S. PATENT DOCUMENTS

| | | | | |
|---|---|---|---|---|
| 5,467,137 A * | 11/1995 | Zdepski | ................... | 375/240.29 |
| 6,819,685 B1 * | 11/2004 | Abouchakra et al. | ......... | 370/519 |
| 6,963,561 B1 * | 11/2005 | Lahat | ............................ | 370/356 |
| 7,043,651 B2 * | 5/2006 | Aweya et al. | ................. | 713/400 |
| 7,093,275 B2 * | 8/2006 | Birks et al. | ..................... | 725/105 |
| 2002/0024970 A1 | 2/2002 | Amaral et al. | | |
| 2003/0174734 A1 * | 9/2003 | Compton et al. | ............. | 370/503 |
| 2003/0189953 A1 * | 10/2003 | Matsumura et al. | .......... | 370/503 |
| 2004/0062278 A1 * | 4/2004 | Hadzic et al. | ................. | 370/503 |
| 2005/0060753 A1 * | 3/2005 | Lundblad et al. | ............. | 725/100 |

FOREIGN PATENT DOCUMENTS

| | | |
|---|---|---|
| CN | 1100878 | 3/1995 |
| EP | 0 624 983 | 11/1994 |
| GB | 2 305 080 | 3/1997 |
| WO | WO 95 26596 | 10/1995 |
| WO | WO 99 60755 | 11/1999 |

OTHER PUBLICATIONS

"Information Technology—Generic Coding of Moving Pictures and Associated Audio Information: Systems" ITU-T Recommendation H.222.0, XX, XX, Feb. 2000, pp. I-XVI,1, XP001032469.

* cited by examiner

*Primary Examiner* — Christopher S Kelley
*Assistant Examiner* — Christopher Findley
(74) *Attorney, Agent, or Firm* — Oblon, Spivak, McClelland, Maier & Neustadt, L.L.P.

(57) ABSTRACT

A method of synchronizing the phase of a local image synchronization signal generator of a local video data processor in communication with an asynchronous switched packet network to the phase of a reference image synchronization signal generator of a reference video data processor also coupled to the network, the local and reference processors having respective clocks, the reference and local image synchronization signal generators generating periodic image synchronization signals in synchronism with the reference and local clocks respectively comprises the steps of:

frequency synchronizing the local and reference clocks;
the reference video data processor sending, via the network, to the local data processor an image timing packet providing reference image synchronization data indicating the difference in timing, measured with respect to the reference processor's clock, between the time at which the image timing packet is launched onto the network and the time of production of a reference image synchronization signal; and
the local processor controlling the timing of the production of the local image synchronization signal in dependence on the reference image synchronization data and the time of arrival of the timing packet.

24 Claims, 6 Drawing Sheets

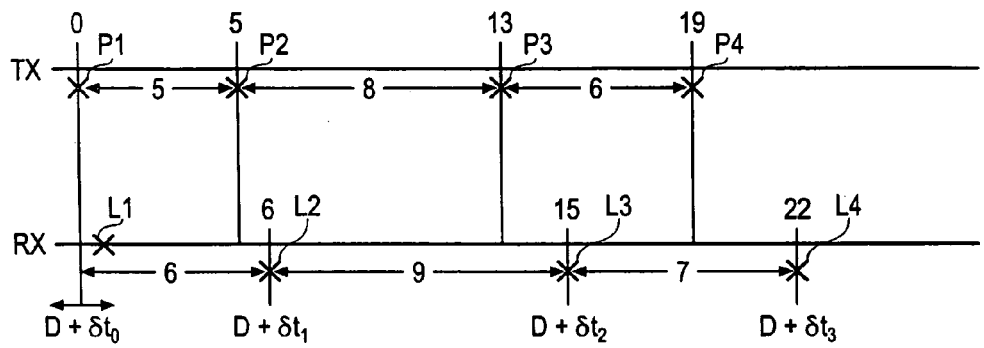
| Second, RX, diff. | 6 | 9 | 7 | |
|---|---|---|---|---|
| First, TX, diff. | 5 | 8 | 6 | Fig. 2 |
| Error | 1 | 1 | 1 | |
| Cumulative Error | 1 | 2 | 3 | |
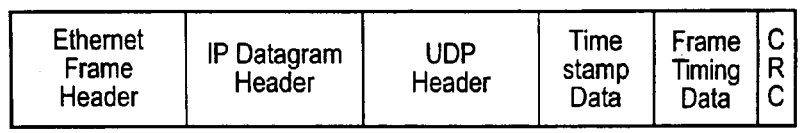
Fig. 3: UDP Timing Packet
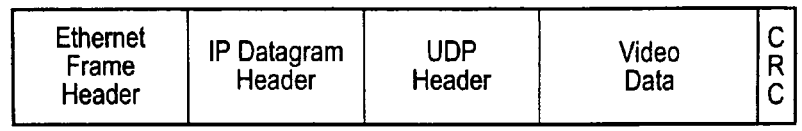
Fig. 7: Video Packet
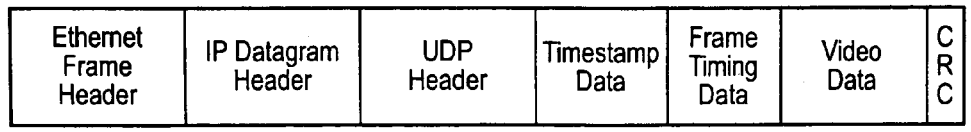
Fig. 8: Combined Packet
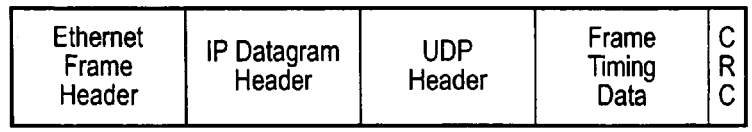
Fig. 9: UDP Frame Timing Packet

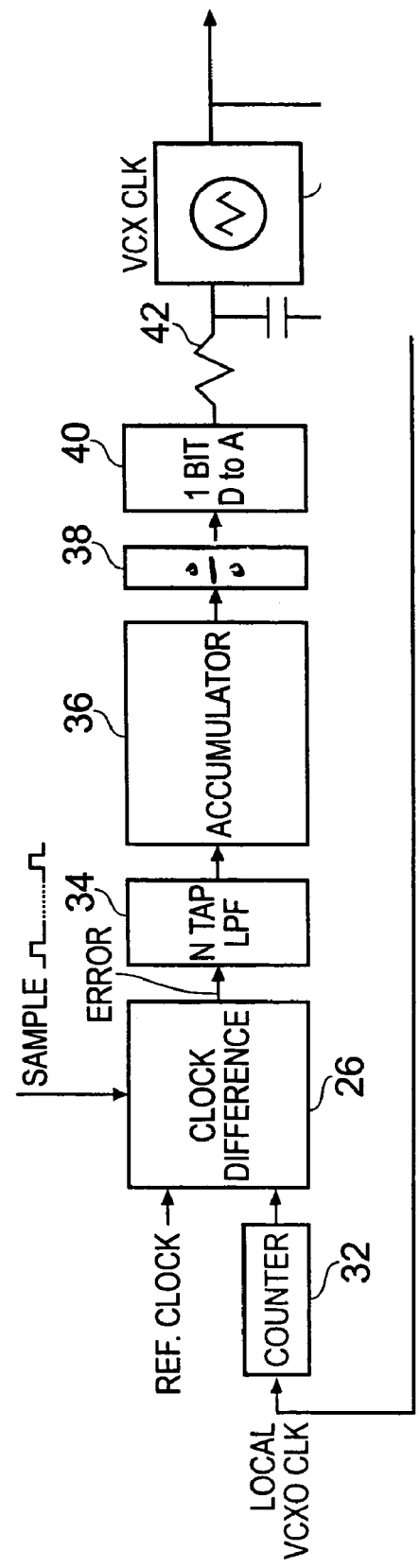
Fig. 4: Frequency Locking System

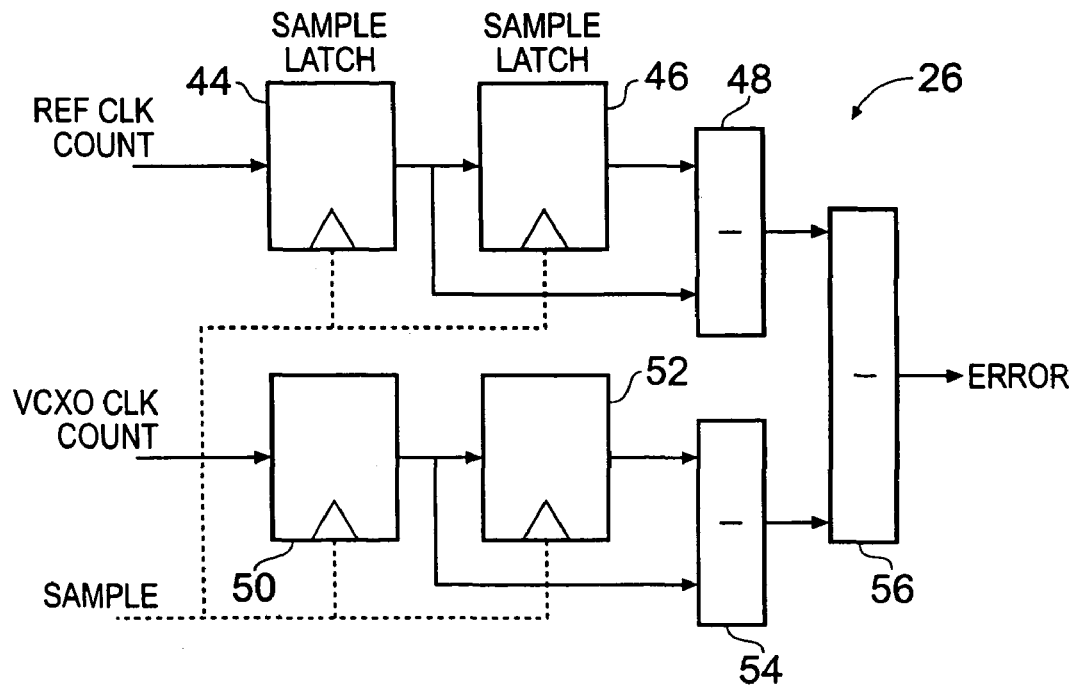
Fig. 5: Clock Difference Circuit
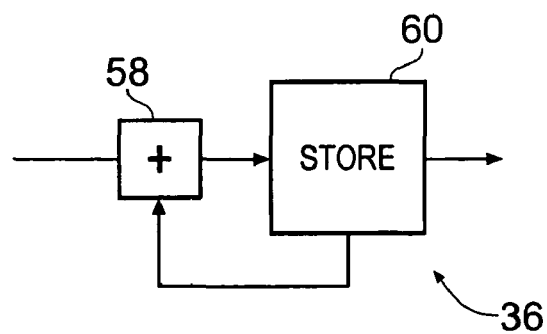
Fig. 6: Accumulator

X = δt_f - Packet Timing

VIDEO SYNCHRONIZATION

BACKGROUND OF THE INVENTION

1. Field of the Invention

The present invention relates to video synchronisation.

2. Description of the Prior Art

It has been proposed to distribute video data over an asynchronous switched network. The data may be distributed to many receivers which process the data independently of one another. Some processes at the receivers require two video streams to be processed synchronously, for example a simple cut between two video streams must be accurate to one frame boundary. However an asynchronous network does not inherently maintain frame synchronisation and different paths taken by the video streams through the network may be subject to different delays.

A prior proposal, demonstrated at the NAB 2001 conference, distributed video data over a network. Timing data linking local clocks to a reference clock was distributed over another, separate, network ITU-T Rec H222.0 (1995E) discloses that within the ITU-T Rec H222.01 ISO/IEC 13818-1 systems data stream (i.e. MPEG) there are clock reference time stamps called System Clock References (SCRs). The SCRs are samples of the System Time Clock (STC). They have a resolution of one part in 27 MHz and occur at intervals of up to 100 ms in Transport Streams and up to 700 ms in Program Streams. Each Program Stream may have a different STC. The SCR field indicates the correct value of the STC of an encoder at the time the SCR is received at a corresponding decoder. With matched encoder and decoder clock frequencies, any correct SCR value can be used to set the instantaneous value of the decoder's STC. This condition is true provided there is no discontinuity of timing, for example the end of a Program Stream. In practice the free running frequencies of the clocks will not be matched. Thus there is a need to match or "slave" the clock of the decoder (a voltage controlled oscillator) to that of the encoder using a Phase Locked Loop (PLL). At the moment each SCR arrives at the decoder it is compared with the STC of the decoder. The difference, (SCR-STC), is an error which is applied to a low pass filter and a gain stage to generate a control value for the voltage controlled oscillator at the decoder.

The system described above uses a synchronous network and locks the absolute time of the decoder clocks to the reference clock.

The present invention seeks to provide frame synchronisation of video streams at a destination at which the streams are processed, the destinations being linked to sources of the video streams by an asynchronous packet switched network without necessarily requiring infrastructure additional to the network.

SUMMARY OF THE INVENTION

This invention provides a method of synchronising the phase of a local image synchronisation signal generator of a local video data processor in communication with an asynchronous switched packet network to the phase of a reference image synchronisation signal generator of a reference video data processor also coupled to the network, the local and reference processors having respective clocks, the reference and local image synchronisation signal generators generating periodic image synchronisation signals in synchronism with the reference and local clocks respectively, the method comprising the steps of:

frequency synchronising the local and reference clocks;

the reference video data processor sending, via the network, to the local data processor an image timing packet providing reference image synchronisation data indicating the difference in timing, measured with respect to the reference processor's clock, between the time at which the image timing packet is launched onto the network and the time of production of a reference image synchronisation signal (e.g. an immediately preceding reference image synchronisation signal); and the local video data processor controlling the timing of the production of the local image synchronisation signals in dependence on the reference image synchronisation data and the time of arrival of the timing packet.

It will be understood that the reference video data processor could simply be a source of timing information, or could also handle video information to be launched onto the network.

Sending the image timing packet allows adjustment of the timing of image (e.g. field or frame or a multiple of either) sync pulses at the local video processor to the timing of the image sync pulses at the reference processor, without requiring infrastructure additional to the network. By using, as the reference clock data, data which is current at the time at which the packet is sent (launched onto the network); the effect of any processing delay or jitter in the source data processor can be reduced.

The method assumes that the delay through the network is zero or equal for all paths through the network. This can be a good approximation in many circumstances. However, in practice it may not be true. To alleviate this problem a preferred embodiment of the method comprises the step of adding a delay to the local image synchronisation signal.

The delay may be a predetermined delay, for example, 2, 4 or 6 video lines. The delay is preferably chosen to be equal to or greater than the largest delay through the network. The delay may be fixed. The delay may be selected by a controller in dependence upon the paths of video signals through the network.

In an embodiment of the method, the step of frequency synchronising the local and reference clocks comprises the steps of: sending, to the local data processor from the reference data processor across the network, clock timing packets each including a field containing the destination address of the local processor and a field containing reference clock data indicating the time at which the clock timing packet is sent; and controlling the frequency of the local clock in dependence on the reference clock data and the times of arrival of the clock timing packets.

Sending timing packets over the network allows the clocks to be synchronised without necessarily requiring infrastructure additional to the network. By using, as the reference clock data, data which is that current at the time at which the packet is sent (launched onto the network) the effect of any processing delay or jitter in the source data processor is reduced. For example, a time packet generator creates a timing packet with an empty time data field. At (or just before) the moment at which the packet is launched onto the network, the reference time is sampled and the time is put into the time data field.

These and other aspects of the invention are set out in the claims to which attention is directed.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 2 is a schematic timing diagram illustrating the operation of the network of FIG. 1 in respect of clock timing packets;

FIG. 3 is a schematic diagram illustrating an example of a frame timing packet;

FIG. 4 is a schematic block diagram of an illustrative frequency locked loop (FLL) used in the receiver of FIG. 1;

FIG. 5 is a schematic block diagram of an illustrative clock difference circuit used in the FLL of FIG. 4;

FIG. 6 is a schematic block diagram of an illustrative accumulator used in the FLL of FIG. 4;

FIG. 7 is a schematic diagram illustrating an example of a video packet;

FIG. 8 is a schematic diagram illustrating an example of a frame timing and video packet;

FIG. 9 is a schematic diagram illustrating another example of a frame timing packet according to the invention;

In the examples described below, a frame synchronisation signal is referred to. It will be appreciated that a field synchronisation signal could be used instead, or a signal which occurs at a multiple of field or frame periods, or the like. Accordingly, the term "frame synchronisation signal" and related terms should be read as including these variants.

DESCRIPTION OF THE PREFERRED EMBODIMENTS

Figure 1:
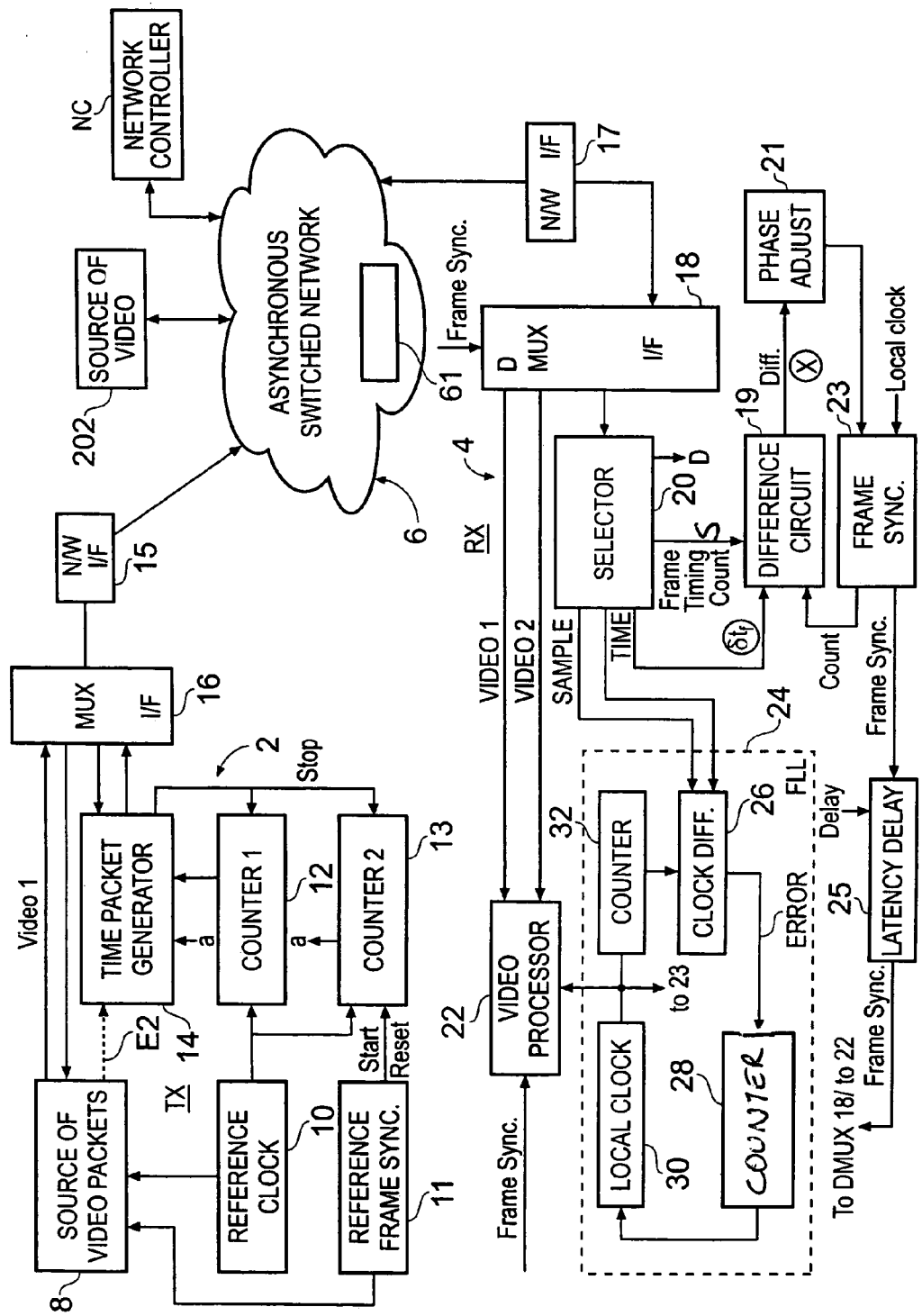
FIG. 1 is a schematic block diagram of an illustrative asynchronous switched network according to the invention to which are coupled a transmitter which transmits video and associated clock data and frame timing data onto the network and a corresponding receiver.

Referring to FIG. 1, in this example video is transmitted from a transmitter 2, at one node of an asynchronous packet switched network 6, over the network to one or more receivers 4 (only one shown) at other nodes thereof. The transmitter 2 and the receivers 4 may be, or include, or form part of, network interface cards. The network in this example is an Ethernet network but could be any other asynchronous switched packet network, for example a Token Ring network.

The network 6 includes an asynchronous switch 61 which duplicates the video (and timing) packets described below supplied by the transmitter 2 and distributes them to the receivers 4.

Transmitter

At the transmitter, the video is produced by a source 8 synchronously with clock pulses from a reference clock 10 and with frame sync pulses from a frame sync circuit 11. In this example the video comprises SDI frames of 1440 video samples per line and 625 lines per frame produced synchronously with a 27 MHz sampling clock and frame sync pulses. (Note that to decode the video at the receiver 4, the local clock 30 needs to operate at 27 MHz (+/− a small tolerance). Thus the local clock 30 needs to be frequency synchronised with the reference clock 10.)

The video packets are passed to an interface and multiplexer 16 which supplies the packets to a network interface 15. The network interface 15 sends the video packets across the network in conventional manner. A first counter 12 counts the clock ticks (cycles) of the reference clock. A timing packet generator 14, which operates under the control of the interface 16 obtains the reference count of the counter 12 at any time when the network has spare capacity to transmit a timing packet and places it into the time stamp data field (see FIG. 3) of a timing packet which is then sent across the network. The time stamp data is the time indicated by the reference clock at the time the packet is sent. The timing packets are produced including reference counts and transmitted to a receiver 4 at frequent, but potentially varying, intervals.

Figure 10:
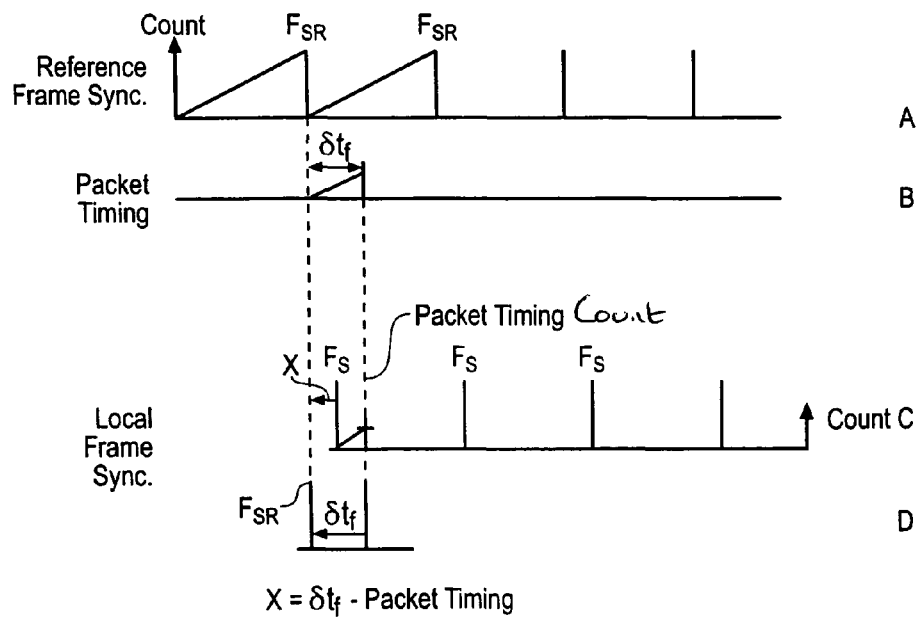
FIG. 10 is a schematic timing diagram illustrating the operation of the network of FIG. 1 in respect of frame timing packets.

The frame sync circuit 11 operates synchronously with the clock 10 and produces for the source 8 a frame sync pulse once per video frame in conventional manner. Referring to FIGS. 1 and 10, a second counter 13 counts reference clock pulses for an interval $\delta t_f$ and supplies the count $\delta t_f$ to the time packet generator 14 which places the count in the frame time data field of the packet shown in FIG. 3. The interval $\delta t_f$ begins at the time of production of a frame sync pulse and ends at the time when the timing packet is sent. Each frame sync pulse resets the count of the counter 13 to zero. The interval stops on receipt of a signal from the timing packet generator that the count has been loaded into the packet. Thus the count $\delta t_f$ at that time represents the time interval between the time of launch of the timing packet onto the network and the most recent preceding sync pulse.

In the example of FIG. 1, the video data is transmitted across the network 6 as packets in conventional manner. Time stamp and frame timing data packets (hereinafter referred to as timing packets), an example of which is shown in FIG. 3, are also produced, separately from the video and also transmitted across the network 6.

Receiver

The receiver 4 comprises a network interface 17 corresponding to the interface 15, and an interface 18 corresponding to the interface 16, which feeds video packets to a video processor 22 and timing packets to a time packet selector 20.

The selector 20 extracts the timing data from the timing packet and also supplies a sampling signal indicating the time at which the packet was received by the selector 20. The timing data and sampling signal are supplied to a Frequency Locked Loop (FLL) which includes, and controls, the local clock 30. The FLL is a sample data control system. Details of the clocking of samples through the FLL are omitted because such details are not of relevance to the understanding of the present embodiments and are within the normal skill of FLL designers.

The video processor 22 requires the local clock 30 to operate at the same frequency (27 MHz) as the reference clock 10 to correctly process the video. As shown in FIGS. 1 and 4, the FLL comprises a counter 32, identical to the first counter 12, which counts the ticks of the local clock 30 to produce a local count and a clock difference circuit stage 26. The clock difference circuit 26 forms the difference of first and second differences. The first difference is the difference of the reference counts produced by the first counter of successive timing packets. The second difference is the difference of the corresponding local counts produced at the time of reception of the reference counts. The clock difference circuit is described in more detail below with reference to FIG. 5.

By way of explanation, attention is invited to FIG. 2. The reference and local clocks are ideally operating at exactly 27 MHz. However in practice one or both operates with a (small) frequency error. The local clock must operate at the same frequency (+/− a very small tolerance) as the reference clock. Assume for example that the local clock operates at a slightly higher frequency than the reference clock. The transmitter transmits timing packets P1 to P4 at irregular intervals. At least one, and preferably a plurality, of packets are transmitted per wrap interval of the counter 12. For example with a 27 MHz clock and a 32 bit counter 12, the wrap interval is 159 seconds and so at least one packet is transmitted every 159 seconds. Preferably, however, packets are transmitted more frequently than that, for example ten per second. The timing packets are described in more detail below. In the example of FIG. 2, the packets P1 and P2 are transmitted at times spaced by 5 clock ticks of the reference clock 10. The packets P2 and P3 are spaced by 8 ticks and the packets P3 and P4 are spaced by 6 ticks. The packets are received by the receiver after a network delay; assume that delay is constant D. The local counts at the times of reception of the packets P1 to P4 are L1 to L4. The counts L1 and L2 are spaced by 6 local clock ticks. L2 and L3 by 9 and L3 and L4 by 7. Thus the first differences are 5, 8 and 6 and the second differences are 6, 9 and 7 indicating the local clock is operating at a higher frequency than the reference clock. The difference of the first and second differences is the error which is used by the FLL to control the frequency of the local clock.

Forming the error from the first and second differences has the following advantages. The (fixed) delay D has no effect on the error. The absolute values of the reference and local counts are of no consequence. Furthermore, if a timing packet is not received it has little effect. For example assume packet P2 is not received: then count L2 is not produced. However the difference (P3−P1)=(P2−P1)+(P3−P2) and (L3−L1)= (L2−L1)+(L3−L2) so (L3−L1)−(P3−P1)=2 in the example of FIG. 2 which is the same as the cumulative error with all the packets received.

The foregoing discussion assumes that D is fixed. D is the processing delay of the network. The processing delay in the switch 61 for example is dependent on the average size of the packets switched by it. Thus D may change for instance due to a change in the size of the timing packets, which results in a change in the processing delay in the network. If D changes, then stays at its new value, the change affects the difference of the first and second differences only once at the time it changes.

The foregoing discussion also ignores network jitter δt which affects the timing of reception of the timing packets at the receiver, and thus affects the corresponding local counts L. The jitter δt causes a variation in the differences in the times of arrival of the packets at the decoder 4. The jitter δt is regarded as noise. The FLL as shown in FIG. 4 includes a Low Pass Filter 34 which low pass filters the error produced by the clock difference circuit 26 to reduce the jitter. The filter is for example an N tap digital filter.

The filter 34 is followed by an accumulator 36. An example of the accumulator is shown in FIG. 6 which is described in more detail below. The accumulator continuously accumulates the low pass filtered error. The accumulator is needed to ensure that once frequency lock occurs and thus the error is zero, then the local clock which is a voltage controlled oscillator 30 has a stable, non-zero control value applied to it to prevent "hunting". By way of explanation assume that the local clock operates at 27 MHz+X Hertz with zero control input. In the absence of the accumulator, when lock is achieved at 27 MHz, then the error and thus the control input is zero so the clock tends to drift towards operating at 27 MHz+X. By providing the accumulator, the accumulated error signal forces the clock to operate at frequency lock and when that is achieved the error into the accumulator becomes zero and thus the accumulated value stays constant but non-zero.

The accumulator is followed by a divider 38 which reduces the sensitivity of the clock to small fluctuations (e.g. due to noise) at the output of the accumulator.

The divider 38 is followed by a digital to analogue converter 40 for producing an analogue control value for the voltage controlled oscillator 30. The converter is preferably a single bit converter followed by an RC circuit 42 to remove high order harmonics produced by the converter.

The filters 34 and 42, the accumulator 36 and the divider 38 together define the time constant and loop gain of the FLL. The time constant defines the time taken by the FLL to achieve lock. To try to reduce that time, it is preferable to use the known technique of varying the Low Pass filter 34 and the loop divider 38 to firstly achieve fast but coarse lock and then fine but slower lock.

1 Bit D to A Converter 40, FIG. 4

This may be a simple pulse width modulator or a random dither module. A random dither module requires a shorter RC time constant (42) when operating at the centre of its range.

Figure 13:
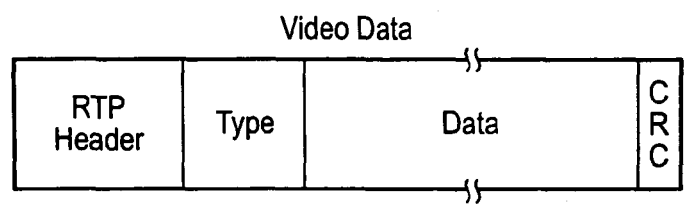
FIG. 13 illustrates the format of video data in a video packet.

Video Packets (FIG. 7 and FIG. 13)

A video packet shown in FIG. 7 comprises an Ethernet frame header, an IP datagram header, a UDP header, video data and CRC error detection data. A video data packet shown in FIG. 13 (to be described below) comprises an RTP header, a type field, video data and CRC data.

Timing Packet, FIG. 3.

The Ethernet packet of FIG. 3 comprises an Ethernet frame header, followed in order by an IP datagram header, a UDP header, time stamp data which is the reference count mentioned above, frame timing data which is the count δt$_f$ and a CRC (cyclic redundancy code for error checking). The packet contains as address data at least the destination address(es) of the receiver(s) 4, which may be a group address. The packet may contain both the source address of the transmitter 2 and the destination address(es) of the receiver(s) to which the transmitter is transmitting. The packet includes data which identifies it as a timing packet. That data may be included in one or more of the headers in known manner.

Various types of address data may be provided depending on different operating modes.

In a point to point operating mode in which one transmitter sends data to one selected receiver, the destination address is an address solely of the selected receiver.

In a one to many operating mode in which one transmitter sends data to a group of many receivers, the destination addresses of all the receivers is included (or if they have a group or multicast address, the address of the group is included).

In a one to all operating mode in which data is broadcast from the transmitter to all receivers on the network, the address data is a broadcast address which is recognised as applying to all receivers.

The network switch 61 decodes the address data. In the broadcast and group operating modes, it receives one packet from the transmitter and duplicates that packet for transmission to all the receivers designated by the address data.

Clock Difference Circuit 26, FIG. 5.

The illustrative clock difference circuit of FIG. 5 comprises four data latches 44, 46, 50 and 52. The reference count extracted from the timing packet is latched into the latch 48 in response to the sampling signal which indicates the time at which the selector 20 received the packet. The sampling signal also causes the latch 50 to latch the local count of the counter 28 of the FLL. The previous contents of the latches 44 and 50 are latched into the subsequent latches 46 and 52 in response to the sampling signal. Thus referring to FIG. 2, by way of example, the latch 44 may contain count P2, the latch 46 may contain count P1, and the latches 50 and 52 contain corresponding counts L2 and L1 respectively. A subtractor 48 forms the difference (i.e. the first difference mentioned above) of the reference counts in the latches 44 and 46 e.g. P2−P1. A subtractor 54 forms the difference (i.e. the second difference mentioned above) of the local counts in the latches 50 and 52, e.g. L2−L1. A subtractor 56 forms the difference of the first and second differences. The output of the subtractor 56 is the error which controls the local clock 30.

Accumulator 36, FIG. 6

The illustrative accumulator of FIG. 6 comprises an adder 58 and a store 60. The adder adds the value of the current error (as processed by the filter 34) to the content of the store 60. The store contains the cumulative error shown in FIG. 2.

Preferably (and practically) the maximum value storable in the accumulator 36 is limited but the limit is placed outside the normal operating range of the FLL.

Frame Synchronisation at the Destination.

Referring back to FIG. 1, at the destination 4, a local frame sync circuit 23 produces local frame sync pulses by counting the local clock ticks which as described above are frequency synchronised with the reference clock 10. The frame sync generator 23 is a counter which is reset to zero on the production of each frame sync pulse identically to frame sync pulse generator 11. A difference circuit 19 calculates the difference X between the count $\delta t_f$ derived from the frame timing data of the timing packet of FIG. 3, 8 or 9 and the count of the frame sync generator at the time of reception of the timing packet as indicated by the sampling pulse S. That difference X is used by a phase adjuster 21 to synchronise the frame sync generator 23 with the frame sync generator 10 on the assumption that the delay applied by the network to the timing packets is zero or is substantially the same across all recipients of those packets.

Referring to FIG. 10, line A shows diagrammatically the count of the reference frame sync pulse generator 10 and of the second counter 13. The count $\delta t_f$ is shown in line B, which is the count of counter 13 at the time of production of the timing packet of FIG. 3, 8 or 9. Assuming zero delay through the network, the local frame sync pulses might for example be produced at times shown in line C out of phase with the reference frame sync pulses of line A. The count in the counter 23 of the local frame sync pulse generator 23 when the timing packet is received is shown as "packet timing count" in the line C. The correct reference phase of the frame sync pulses is $\delta t_f$ before that as shown in line D. That is a count of X=$\delta t_f$−(packet timing count) before the actual timing of the local sync pulse.

The count is shown with reference to an immediately preceding local frame sync pulse, but of course it could be derived with respect to any local frame sync pulse.

In an example, only one timing packet including the frame timing data $\delta t_f$ is produced after the local clock 30 is synchronised to the reference clock. The phase adjustment of the local frame sync generator 23 takes place only once; it retains its phase because the local clock is correctly frequency synchronised. It will be noted that the local clock 30 and the local frame sync 23 are, in general, not phase synchronised to the reference clock 10 and the reference frame sync 11. In other examples, of course, such timing packets are sent repeatedly.

As discussed, the assumption has been made that the delay through the network is zero. In fact the network does impose a delay on video packets and that delay may be different for different paths through the network. The delay applied to the timing packets may thus be different to the delay applied to video packets. To compensate for that delay, a latency delay is added to the frame sync pulses in a delay circuit 25. The latency delay may be a predetermined, fixed, delay. An example of such a delay is l video lines where l may be 2, 4 or 6 for example. In another example the latency delay $D_{lat}$ is variable and defined by a message sent across the network from a network controller NC which may comprise a personal computer having a standard network interface card and which is able to generate messages defining the delay $D_{lat}$.

As shown in FIG. 1, the video processor 22 receives two video streams video 1 and video 2 from two sources 2 and 202. Source 202 has a local clock which is synchronised to the reference clock as described for destination 4.

The video processor 22 receives the two video streams from the demultiplexer 18. The frame alignment of the two video streams in accordance with the frame sync takes place in the demultiplexer 18 as will be described below. Alternatively, the frame alignment of the two video streams could take place in the video processor.

Figure 12:
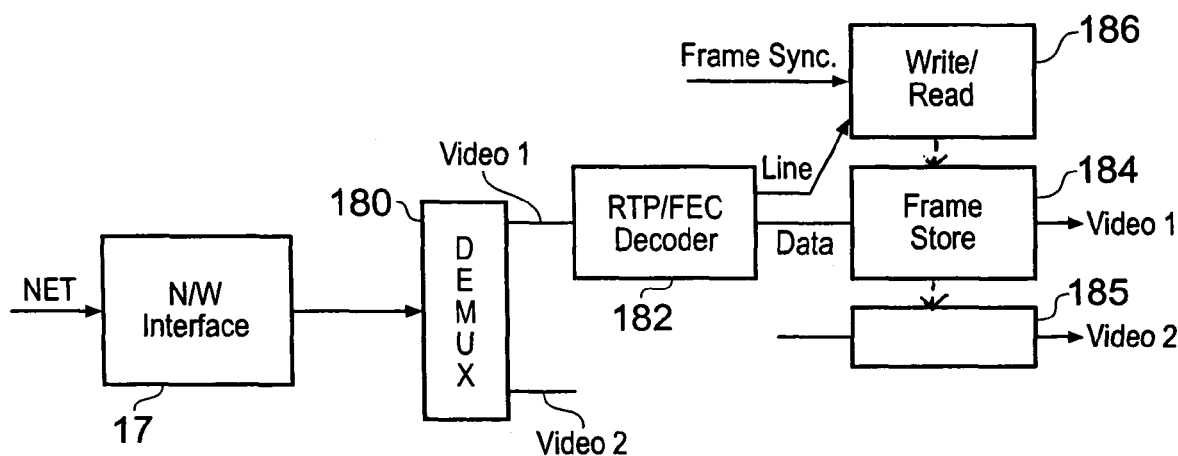
FIG. 12 illustrates an example of the video processor of FIG. 1.

Frame Alignment FIGS. 12 and 13

Referring to FIG. 12, the network interface 17 delivers video packets of the two video streams to a demultiplexing circuit 180 of the demultiplexer 18. The circuit 180 directs video data of the first video stream to a first channel including a frame store 184 and the video data of the second stream to a second channel including a frame store 185. The video packets may be as shown in FIG. 7. The IP datagram header together with the UDP header and the RTP header define the channels to which the packets are directed. The circuit 180 reads the IP header and the UDP header, and removes those headers.

Assume the video data of the packets of FIG. 7 corresponds to the video data shown schematically in FIG. 13 and includes an RTP header and a type field. The type field identifies the type of video data, e.g. PAL, and other details. The RTP header includes a sequence number which allows a sequence of packets to be reassembled in the correct order and preferably also a scan line number for each packet (See Reference 1). The RTP header allows the video data to be written into a frame store 184 or 185 under the control of a write/read controller 186 in the correct sequence to reconstruct a video frame from a sequence of packets. Thus a header decoder 182 decodes the header and removes it from the video data, feeds the video data to the frame store 184 and provides the controller 186 with data, such as the scan line number, required to write the video data into appropriate addresses in the frame store.

The controller 186 initiates read out of video frames from the frame stores 184 and 185 in synchronism with the local frame sync, with a further delay if required.

The RTP decoder and frame store are shown as part of the demultiplexer. Instead, they may be part of the video processor 22.

Video Packets

In a first example, the video packets are transmitted across the network 6 separately from the timing packets. As shown in FIG. 7, the video packets have the same basic structure as the timing packets. The packet includes data which identifies it as a video packet. That data may be included in one or more of the headers in known manner.

Sending timing packets separately from video packets allows timing packets to be broadcast so that all video processors on the network have local clocks frequency synchronised with the reference clock, and to have frame synchronisers in frequency synchronism with the reference frame sync, while still allowing video to be sent on a point to point basis.

Video Processor 22, FIG. 1.

The video processor 22 may be any video processor including, for example, a monitor, an editor, a special effects machine, and/or a VTR.

Second Example

In contrast to the first example, in the second example, the timestamp data and the frame timing data and the video data may be combined in one packet with common (broadcast) address data.

Such a packet is shown schematically in FIG. 8. The packet includes headers as described with reference to FIG. 3 or 7. The packet includes data which identifies it as a combined time and video packet. That data may be included in one or more of the headers in known manner. The time stamp data field which contains a small amount of data precedes the video data field which contains a much greater amount of data. A video sequence is transmitted using many packets. The time data may be included in only some, but not all, of the packets. The time data may be included in a combined video packet at frequent, but varying, intervals at times when the network has spare capacity as described above.

Referring to FIG. 1, the combined video and timing packet is generated in the source 8 but the timestamp data field and the frame timing data field are empty at that stage. The packet is fed to the time packet generator 14 via the connection E2 shown by a dashed line. The time packet generator 14 fills the time stamp data field with the time stamp data and fills the frame timing data field with the frame timing data at the moment the combined packet is launched onto the network under the control of the multiplexer 16.

Third Example

Referring to FIG. 9, the frame timing data may be placed in a packet which contains only an Ethernet frame header, followed in order by an IP datagram header, a UDP header, frame timing data which is the count $\delta t_f$ and a CRC. The time stamp data which is the reference count mentioned above is sent in a separate packet (not shown) comprising an Ethernet frame header, followed in order by an IP datagram header, a UDP header, the time stamp data and a CRC.

Modifications

In an example described above, one timing packet is produced which contains a single measurement of the value $\delta t_f$ which is used to control the local frame synchronisation signal generator 23.

Figure 11:
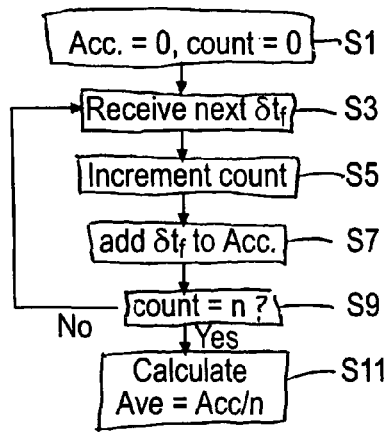
FIG. 11 is a flow chart illustrating a mode of operation of the difference circuit of FIG. 1.

Referring to FIG. 11, in a modification, the average of several measurements of the value $\delta t_f$ is used to control the local generator 23. The second counter 13 operates to produce a first value of $\delta t_f$ at a packet transmission time as described above. One or more subsequent values of $\delta t_f$ are measured at subsequent packet transmission times. The difference circuit 19 of FIG. 1 comprises a processor which operates as shown in the flow diagram of FIG. 11.

Thus at a step S1, an accumulator value is set to zero and a count of the number of values $\delta t_f$ is set to zero. At a step S3, a first value of $\delta t_f$ is received, and the count is incremented by one (at a step S5). At a step S7, the content of the accumulator is incremented by $\delta t_f$. A step S9 determines whether the count has reached a threshold number n. If not, the next $\delta t_f$ is received at the step S3 and the steps S5, S7 and S9 repeat until the count equals n. Then a step S11 calculates an average value of $\delta t_f$.

The transmitter 2 of FIG. 1 includes the reference clock 10, the reference frame sync generator 11, and also a source of video packets 8. In another example, the transmitter need not include the source of video signals. Thus the reference clock and the reference frame sync operate independently of any data source. A data source then requires a local clock which is frequency synchronised with the reference clock via a local direct connection or as described herein and frame syncs which are synchronised with reference frame syncs.

Whilst the foregoing describes an example in relation to an Ethernet network, the techniques may be used in any asynchronous switched network. The network 6 may be a wired or wireless network or a combination of both wired and wireless.

Different Video Clocks

It is possible to have two or more video clocks in operation in the systems described above. In examples where timing packets are broadcast separately from the video data, a receiver would select those timing packets relevant to a particular clock signal. Where timing information is combined within a video packet, the receivers could align to the timing information relevant to a video feed which they are receiving.

The transmitter 2 and the receiver 4 may be implemented as hardware. They may alternatively be implemented by software in a suitable data processor or as a mixture of software and hardware. A preferred implementation uses programmable gate arrays. It is envisaged that the present invention includes a computer program which when run on a suitable data processor implements at least some aspects of the above embodiments, the computer program being provided by (for example) a storage medium such as an optical disk, or a transmission medium such as a network or internet connection.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

REFERENCES

1. RTP payload format for BT.656 Video encoding, D Tynan (Claddagh films) RFC2431, October 1998.

We claim:

1. A method of synchronizing the phase of a local image frame synchronization signal generator of a local video data processor in communication with an asynchronous switched packet network to the phase of a reference image frame synchronization signal generator of a reference video data processor also coupled to said network, said local and reference processors having respective clocks, said reference and local image frame synchronization signal generators generating periodic image frame synchronization signals in synchronism with said reference and local clocks respectively, said method comprising the steps of:

frequency synchronizing said local and reference clocks;

said reference video data processor sending, via said network, to said local data processor one image timing packet providing reference image frame synchronization data indicating a difference in timing, measured with respect to said reference processor's clock, between a time at which said image timing packet is launched onto said network and a time of production of a reference image frame synchronization signal;

said local video data processor controlling the phase of production of said local image frame synchronization signals in dependence on said reference image frame synchronization data and a time of arrival of said one image timing packet; and sending to said local video data processor from said reference video data processor, via said network, data packets containing video data, said image timing packet being sent independently of said data packets.

2. A method according to claim 1, in which said controlling includes adjusting said time of production of said local image frame synchronization signal by a correction amount derived from a difference between said reference image frame synchronization data and a time, measured with respect to said local processor's clock and said local image frame synchronization signal, of arrival of said timing packet.

3. A method according to claim 2, further comprising:
sending to said local processor a plurality of said timing packets from said reference processor; and
controlling, by said local processor, said timing of said production of said local image frame synchronization signal in dependence on a function of said differences between:
reference image frame synchronization data in said timing packets; and
respective times of arrival of said timing packets at said local processor.

4. A method according to claim 3, in which said function is an average of said differences.

5. A method according to claim 1, further comprising:
adding a delay to said local image frame synchronization signal.

6. A method according to claim 5, in which said delay is a predetermined delay.

7. A method according to claim 1, wherein said reference data processor includes a source of video data produced synchronously with said reference processor's clock.

8. A method according to claim 1, further comprising:
sensing, by said reference processor, when said network has capacity to carry an image timing packet; and
sending, from said reference processor, an image timing packet when such network capacity exists.

9. A method according to claim 1, in which said frequency synchronizing said local and reference clocks includes the steps of:
sending to said local data processor from said reference processor, via said network, clock timing packets each providing a destination address of said local processor and reference clock data indicating a time at which said clock timing packet is sent; and
controlling, by said local processor, said frequency of said local processor's clock in dependence on said reference clock data and times of arrival of said clock timing packets.

10. A method according to claim 9, further comprising:
counting cycles of said reference processor's clock by said reference processor; and
setting, by said reference processor, said reference clock data as said count of cycles of said reference processor's clock in dependence on a time at which said clock timing packet containing said reference clock data is launched onto said network.

11. A method according to claim 10, further comprising:
counting cycles of said local processor's clock by said local processor;
generating, by said local processor, local clock data as a count of cycles of said local processor's clock at a time of receipt of a clock timing packet containing reference clock data; and controlling, by said local processor, said local processor's clock in dependence on an error signal dependent on a difference between said reference clock data in successively received timing packets and a difference between local clock data indicating said local clock time at said times of receipt of said timing packets.

12. A method according to claim 11, further comprising:
low pass filtering said error signal to generate a low-pass filtered error signal.

13. A method according to claim 12, further comprising:
receiving said low-pass filtered error signal in said local processor; and
controlling, by said local processor, said local processor's clock in dependence on said received error signal.

14. A method according to claim 9, in which said clock timing packet containing said reference image frame synchronization data is independent of said reference clock data.

15. A method according to claim 9, in which said timing packet containing said reference image frame synchronization data also contains said reference clock data.

16. A method according to claim 1, further comprising:
aligning, in said local processor, an image of a video signal with said local image frame synchronization signal.

17. A method according to claim 1, in which said image frame synchronization signal is a field or frame synchronization signal.

18. A method according to claim 1, in which said reference image frame synchronization data indicates a difference in timing, measured with respect to said reference processor's clock, between a time at which said image timing packet is launched onto said network and a time of production of an immediately preceding reference image frame synchronization signal.

19. A method according to claim 1, in which timing packets carrying information relating to at least two image frame synchronization signals are launched onto said network.

20. A computer readable storage medium encoded with program code which when executed by a computer cause a processor to carry out the method according to claim 1.

21. An asynchronous switched network comprising a plurality of nodes, at least one of which nodes is coupled to a data processor that carries out the method of claim 1.

22. A video network, comprising:
a reference video data processor including a reference image frame synchronization signal generator and a reference clock generator, said reference synchronization signal generator configured to generate periodic image frame synchronization signals in synchronism with said reference clock;
a local video data processor including a local image frame synchronization signal generator and a local clock generator frequency-locked to said reference clock generator, said local synchronization signal generator configured to generate periodic image frame synchronization signals in synchronism with said local clock, and synchronizing frequency of a local clock from said local clock generator and a reference clock from said reference clock generator;
an asynchronous packet-based network linking said local processor and said reference processor;
said reference video data processor includes a sending unit configured to send, via said network, to said local data processor one image timing packet providing reference image frame synchronization data indicating a difference in timing, measured with respect to said reference processor's clock, between a time at which said image timing packet is launched onto said network and a time of production of a reference image frame synchronization signal;

said local processor including a controlling unit configured to adjust the phase of production of said local image frame synchronization signal in dependence on said reference image frame synchronization data and said time of arrival of said one timing packet; and said reference video data processor sending to said local video data processor, via said network, data packets containing video data, said image timing packet being sent independently of said data packets.

23. A local video data processor including a local image frame synchronization signal generator and a local clock generator frequency-lockable to a reference clock generator at a reference video data processor and configured to connect to said local video data processor via an asynchronous packet-based network, said local synchronization signal generator configured to generate periodic image frame synchronization signals in synchronism with said local clock, said local video data processor comprising:

a controlling unit configured to adjust the phase of production of said local image frame synchronization signal in dependence on one received image timing packet providing reference image frame synchronization data received indicating a difference in timing, measured with respect to a clock of said reference processor, between a time at which the image timing packet is launched onto said network and a time of production of a reference image frame synchronization signal, provided by the image timing packet from said reference clock generator and a time of arrival of the one image timing packet, and to synchronize frequency of a local clock from said local clock generator and a reference clock from said reference clock generator, wherein said reference video data processor sending to said local video data processor, via said network, data packets containing video data, said image timing packet being sent independently of said data packets.

24. A reference video data processor, comprising:

a reference image frame synchronization signal generator and a reference clock generator;

said reference synchronization signal generator configured to generate periodic image frame synchronization signals in synchronism with said reference clock;

said reference processor configured to connect via an asynchronous packet-based network to a local video data processor having a local image frame synchronization signal generator and a local clock generator frequency-lockable to said reference clock generator, said local frame synchronization signal generator configured to generate periodic image frame synchronization signals in synchronism with said local clock;

said reference video data processor including a phase synchronization unit configured to synchronize a phase of the local image frame synchronization signal generator and a phase of the reference synchronization generator by sending, via said network, to said local data processor one image timing packet providing reference image frame synchronization data indicating a difference in timing, measured with respect to said reference processor's clock, between a time at which said one image timing packet is launched onto said network and a time of production of a reference image frame synchronization signal; and said reference video data processor sending to said local video data processor, via said network, data packets containing video data, said image timing packet being sent independently of said data packets, wherein frequency of a local clock from said local clock generator and a reference clock from said reference clock generator is synchronized.

* * * * *